(12) United States Patent
Kim et al.

(10) Patent No.: US 12,036,905 B2
(45) Date of Patent: Jul. 16, 2024

(54) BACKBOARD ASSEMBLY FOR VEHICULAR REAR SEAT

(71) Applicants: Hyundai Motor Company, Seoul (KR); Kia Corporation, Seoul (KR); Hyundai Transys Inc., Chungcheongnam-do (KR); Daechang Seat Co., LTD-Dongtan, Gyeonggi-do (KR)

(72) Inventors: Eun Sue Kim, Gyeonggi-do (KR); Seung Sik Han, Gyeonggi-do (KR); Hong Heui Lee, Gyeonggi-do (KR); Myung Hoe Kim, Seoul (KR); Cheol Hwan Yoon, Gyeonggi-do (KR); Hae Dong Kwak, Gyeonggi-do (KR); Jun Sik Hwang, Gyeonggi-do (KR); Jong Tak Lee, Gyeonggi-do (KR); Sin Chan Yang, Gyeonggi-do (KR); In Sun Baek, Gyeonggi-do (KR); Myung Soo Lee, Gyeonggi-do (KR); Chan Ki Cho, Gwangju (KR)

(73) Assignees: Hyundai Motor Company, Seoul (KR); Kia Corporation, Seoul (KR); Hyundai Transys Inc., Chungcheongnam-do (KR); Daechang Seat Co., LTD-Dongtan, Gyeonggi-do (KR)

( * ) Notice: Subject to any disclaimer, the term of this patent is extended or adjusted under 35 U.S.C. 154(b) by 335 days.

(21) Appl. No.: 17/530,984

(22) Filed: Nov. 19, 2021

(65) Prior Publication Data
US 2022/0314853 A1    Oct. 6, 2022

(30) Foreign Application Priority Data
Mar. 31, 2021 (KR) .......................... 10-2021-0042086

(51) Int. Cl.
*B60N 2/68*    (2006.01)
*B60N 2/20*    (2006.01)
(Continued)

(52) U.S. Cl.
CPC ............. *B60N 2/686* (2013.01); *B60N 2/206* (2013.01); *B60N 2002/363* (2013.01); *B60R 13/01* (2013.01)

(58) Field of Classification Search
CPC ........ B60N 2/36; B60N 2/206; B60N 2/3013; B60N 2/3075; B60N 2/3072;
(Continued)

(56) References Cited

U.S. PATENT DOCUMENTS 3,114,570 A * 12/1963 Farrow ................ B60N 2/3075
296/66
2008/0185866 A1 * 8/2008 Tarrant ...................... B60R 5/04
296/97.22

(Continued)

FOREIGN PATENT DOCUMENTS

KR    10-2005-0111888 A    11/2005

*Primary Examiner* — Gregory A Blankenship
(74) *Attorney, Agent, or Firm* — Fox Rothschild LLP (57) ABSTRACT

A backboard assembly for a vehicular rear seat is disclosed. The backboard assembly includes an upper part and a lower part, which are made of a hard plastic material. The backboard assembly prevents the formation of a gap between the lower part and a luggage board, regardless of the operational mode of the rear seat. When a seat back is folded, the upper part, the lower part, and the luggage board are aligned in a horizontal direction, thereby allowing the space for passengers in the rear seat to be completely integrated with a luggage compartment.

12 Claims, 8 Drawing Sheets

(51) Int. Cl.
  *B60N 2/36* (2006.01)
  *B60R 13/01* (2006.01)
(58) Field of Classification Search
  CPC .............. B60N 2/3077; B60N 2/3079; B60N 2002/363; B60R 13/01; B60R 13/011; B60R 13/013; B60R 13/02; B60R 13/0268; B60R 13/0275; B60R 2013/015; B60R 2013/016; B60R 2013/018
  See application file for complete search history.

(56) References Cited

U.S. PATENT DOCUMENTS

| | | | | |
|---|---|---|---|---|
| 2009/0001795 A1* | 1/2009 | Homier | ............... | B60N 2/22 297/340 |
| 2010/0026031 A1* | 2/2010 | Jouraku | ............... | B60R 5/044 296/37.16 |
| 2010/0327635 A1* | 12/2010 | Whalen | ............... | B60N 2/3013 297/129 |
| 2011/0133508 A1* | 6/2011 | Zuelch | ............... | B60R 5/006 296/65.16 |
| 2011/0248523 A1* | 10/2011 | Aebker | ............... | B60N 2/36 296/66 |
| 2012/0049588 A1* | 3/2012 | Baker | ............... | B60N 2/3079 297/313 |
| 2012/0139282 A1* | 6/2012 | Gu | ............... | B60J 7/026 296/99.1 |
| 2013/0147226 A1* | 6/2013 | Cao | ............... | B60N 2/36 296/37.16 |
| 2014/0103692 A1* | 4/2014 | Toyama | ............... | B60N 2/20 297/354.1 |
| 2014/0265411 A1* | 9/2014 | Thota | ............... | B60N 2/36 296/37.16 |
| 2014/0265417 A1* | 9/2014 | Thota | ............... | B60N 2/36 296/65.16 |
| 2014/0265418 A1* | 9/2014 | Thota | ............... | B60N 2/206 297/188.05 |
| 2016/0059788 A1* | 3/2016 | Lu | ............... | B60R 5/045 296/37.16 |
| 2017/0088027 A1* | 3/2017 | Watanabe | ............... | B60N 2/36 |
| 2018/0118059 A1* | 5/2018 | Watanabe | ............... | B60N 2/36 |
| 2018/0215327 A1* | 8/2018 | Patrick | ............... | B60R 13/0243 |
| 2018/0281688 A1* | 10/2018 | Matsunami | ............... | B60N 2/3065 |
| 2018/0339634 A1* | 11/2018 | Ness | ............... | B60N 2/0228 |
| 2019/0176661 A1* | 6/2019 | Atkinson | ............... | B60N 2/3095 |
| 2019/0308532 A1* | 10/2019 | Bagian | ............... | B60N 2/3031 |
| 2020/0353848 A1* | 11/2020 | Knaust | ............... | B60R 13/013 |
| 2021/0009014 A1* | 1/2021 | Kondo | ............... | B60N 2/30 |
| 2022/0126740 A1* | 4/2022 | Koinuma | ............... | B60N 3/048 |
| 2022/0242283 A1* | 8/2022 | Sterling | ............... | B60R 5/04 |
| 2022/0266767 A1* | 8/2022 | Zhang | ............... | B60N 2/34 |
| 2022/0314853 A1* | 10/2022 | Kim | ............... | B60N 2/20 |
| 2023/0062855 A1* | 3/2023 | Nagi | ............... | B60N 2/686 |

* cited by examiner

BACKBOARD ASSEMBLY FOR VEHICULAR REAR SEAT

CROSS-REFERENCE TO RELATED APPLICATION

This application claims the priority benefit of Korean Patent Application No. 10-2021-0042086, filed on Mar. 31, 2021, the disclosure of which is incorporated herein by reference.

BACKGROUND

1. Field of the Disclosure

The present disclosure relates to a backboard assembly for a vehicular rear seat, and more particularly to a backboard assembly for a vehicular rear seat which is capable of efficiently preventing the formation of a gap between the backboard assembly and a luggage board and of allowing the passenger space to be completely integrated with a luggage compartment when a seat back is folded.

2. Description of the Related Art

In general, a leisure vehicle (RV, SUV, MPV or the like) is provided with a luggage compartment behind the rear seat thereof to accommodate luggage therein. In such a leisure vehicle, the second- or third-row seat, which is positioned just ahead of the luggage compartment may be defined as a rear seat.

When a seat back of a rear seat is folded forwards by a passenger, the space for passengers in the rear seat communicates with the luggage compartment, thereby securing a larger luggage-loading space. Meanwhile, when the seat back is fully laid backwards and defines a flat surface together with a seat cushion, the rear seat is capable of being used as a bed. When the seat back of the rear seat is folded forwards, a gap may be formed between the rear end of the seat back and the front end of a luggage board. To prevent the formation of this gap, a skirt portion is provided at a lower portion of the rear surface of the pad of the seat back. The luggage board may be defined as the bottom surface of the luggage compartment.

Since a conventional skirt portion of a seat back of a rear seat is made of a flexible fabric material, the shape of the skirt portion is easily deformed when the skirt portion is used a certain number of times or more. The deformation of the shape of the skirt portion reveals a problem whereby it is impossible to efficiently prevent the formation of a gap between the rear end of the seat back and the front end of the luggage board when the seat back is folded forwards.

In addition, since it is difficult to ensure completely integrated communication between the skirt portion having the deformed shape and the luggage compartment, there is a disadvantage of a deteriorated appearance. In particular, since the skirt portion is made of a flexible fabric material rather than a hard material, there is also a disadvantage in that luggage or a hand of a passenger jammed therein.

Details described as the background art are intended merely for the purpose of promoting an understanding of the background of the present disclosure, and should not be construed as an acknowledgment of the prior art that is already known to those of ordinary skill in the art.

SUMMARY

Therefore, the present disclosure has been made in view of the above problems, and it is an object of the present disclosure to provide a backboard assembly for a vehicular rear seat, which is disposed behind the seat back of the rear seat and is coupled thereto and which is capable of efficiently preventing the formation of a gap between the backboard assembly and a luggage compartment regardless of the operational mode of the rear seat, of allowing the space for passengers in the rear seat to be completely integrated with the luggage compartment to thus improve the appearance when the seat back is folded, and of preventing luggage or a hand of a passenger from becoming jammed therein.

In accordance with the present disclosure, the above and other objects may be accomplished by a backboard assembly for a vehicular rear seat that may include an upper part, which is disposed behind a seat back of a rear seat and is coupled thereto, a lower part, which is formed separately from the upper part and is disposed under the upper part to shield a gap between the rear seat and a luggage board, and a hinge connector configured to rotatably connect the upper part to the lower part. The upper part may be provided at a lower end thereof with a recliner shaft extending through the lower end, and may be rotated forwards and backwards with respect to a seat cushion about the recliner shaft together with the seat back.

The backboard assembly may further include a plurality of supports, which are connected at upper portions thereof to one surface of a lower end of the upper part and are positioned before the lower part to overlap at lower portions thereof one surface of an upper end of the lower part, and, when the upper part including the seat back is rotated forwards about the recliner shaft from a position in a normal passenger-sitting mode in which the seat back is erected, lower portions of the supports may come into contact with the upper end of the lower part to support the lower part, whereby the upper part is rotated forwards together with the lower part.

The backboard assembly may further include a plurality of supports, which are connected at upper portions thereof to one surface of a lower end of the upper part and are positioned before the lower part to overlap at lower portions thereof one surface of an upper end of the lower part. When the upper part including the seat back is rotated backwards about the recliner shaft from a position in a normal passenger-sitting mode, in which the seat back is erected, lower portions of the supports may be rotated away from the lower part, whereby only the upper part is rotated backwards about the hinge connector.

The hinge connector may include an upper hinge bracket fixedly coupled to a lower end of the upper part, a lower hinge bracket fixedly coupled to an upper end of the lower part, a hinge shaft configured to rotatably connect the upper hinge bracket to the lower hinge bracket, and a hinge spring wound around the hinge shaft, the hinge spring being coupled at a first end thereof to the upper hinge bracket and at a second end thereof to the lower hinge bracket to provide elastic force to thus spread the upper hinge bracket and the lower hinge bracket straight.

In a normal passenger-sitting mode in which the seat back is erected, the lower part may be maintained in a state of being erected vertically, and an upper end of the lower part may be connected to a front end of the luggage board to prevent the formation of a gap between the lower part and the luggage board. When the seat back is rotated to a predetermined angle to be converted into a relaxation mode from a normal passenger-sitting mode, in which the seat back is erected, the lower part may be maintained in a state of being erected vertically, and an upper end of the lower part may be connected to a front end of the luggage board to prevent the formation of a gap between the lower part and the luggage board.

When the upper part including the seat back is rotated completely backwards to be converted into a flat mode in which the upper part including the seat back defines a flat surface together with a seat cushion, the lower part may be maintained in a state of being erected vertically, and an upper end of the lower part may be connected to a front end of the luggage board to prevent the formation of a gap between the lower part and the luggage board. When the upper end of the lower part is connected to the front end of the luggage board to prevent the formation of a gap between the lower part and the luggage board in the flat mode, an internal structure between the seat back and the luggage board may be shielded to prevent exposure of the internal structure to an outside.

When the upper part including the seat back is rotated completely forwards to be converted into a folded mode, the upper part, the lower part and the luggage board may be aligned with one another in a horizontal direction to prevent the formation of a gap between the lower part and the luggage board. The upper part and the lower part may be made of a hard plastic material.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Specific structural and functional descriptions of embodiments of the present disclosure disclosed herein are provided only for the purpose of illustration of the embodiments of the present disclosure. The present disclosure may be embodied in many different forms without departing from the spirit or significant characteristics of the present disclosure. Therefore, the embodiments of the present disclosure are disclosed only for illustrative purposes, and should not be construed as limiting the present disclosure.

Reference will now be made in detail to various embodiments of the present disclosure, specific examples of which are illustrated in the accompanying drawings and described below, since the embodiments of the present disclosure can be variously modified in many different forms. While the present disclosure will be described in conjunction with exemplary embodiments thereof, it is to be understood that the present description is not intended to limit the present disclosure to those exemplary embodiments. On the contrary, the present disclosure is intended to cover not only the exemplary embodiments, but also various alternatives, modifications, equivalents and other embodiments that may be included within the spirit and scope of the present disclosure as defined by the appended claims.

It will be understood that, although the terms "first", "second", etc. may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It will be understood that when an element is referred to as being "coupled" or "connected" to another element, it can be directly coupled or connected to the other element, or intervening elements may be present therebetween. In contrast, it should be understood that when an element is referred to as being "directly coupled" or "directly connected" to another element, there are no intervening elements present. Other expressions that describe the relationship between elements, such as "between", "directly between", "adjacent to", or "directly adjacent to", should be understood in the same way.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprise", "include", "have", etc., when used in this specification, specify the presence of stated features, integers, steps, operations, elements, components, and/or combinations thereof, but do not preclude the presence or addition of one or more other features, integers, steps, operations, elements, components, and/or combinations thereof.

Unless otherwise defined, all terms including technical and scientific terms used herein have the same meanings as those commonly understood by one of ordinary skill in the art to which this disclosure belongs. It will be further understood that terms, such as those defined in commonly used dictionaries, should be interpreted as having meanings consistent with their meanings in the context of the relevant art and the present disclosure, and are not to be interpreted in an idealized or overly formal sense unless expressly so defined herein.

The control unit (controller) according to an exemplary embodiment of the present disclosure may be embodied by nonvolatile memory (not shown) configured to store an algorithm configured to control the operation of various components of a vehicle or data relating to software instructions for executing the algorithm and a processor (not shown) configured to perform operations, which will be described below, using the data stored in the memory. In particular, the memory and the processor may be embodied by separate chips. Alternatively, the memory and the processor may be embodied by a single chip in which the memory and the processor are integrated. The processor may be embodied as one or more processors. The controller is understood to be a hardware device having a memory and a processor.

Hereinafter, a backboard assembly for a vehicular rear seat according to a preferred embodiment of the present disclosure will be described with reference to the accompanying drawings. A leisure vehicle (RV, SUV, MPV or the like) is provided with a luggage compartment behind the rear seat thereof to accommodate luggage therein, and the second- or third-row seat, which is positioned just ahead of the luggage compartment may be defined as a rear seat.

As illustrated in FIGS. 1 to 8, a rear seat 10 for a leisure vehicle may include a seat cushion 11, configured to support the lower body of a passenger sitting thereon, a seat back 12, configured to support the upper body of the passenger, and a headrest, configured to support the neck and head of the passenger.

Figure 1:
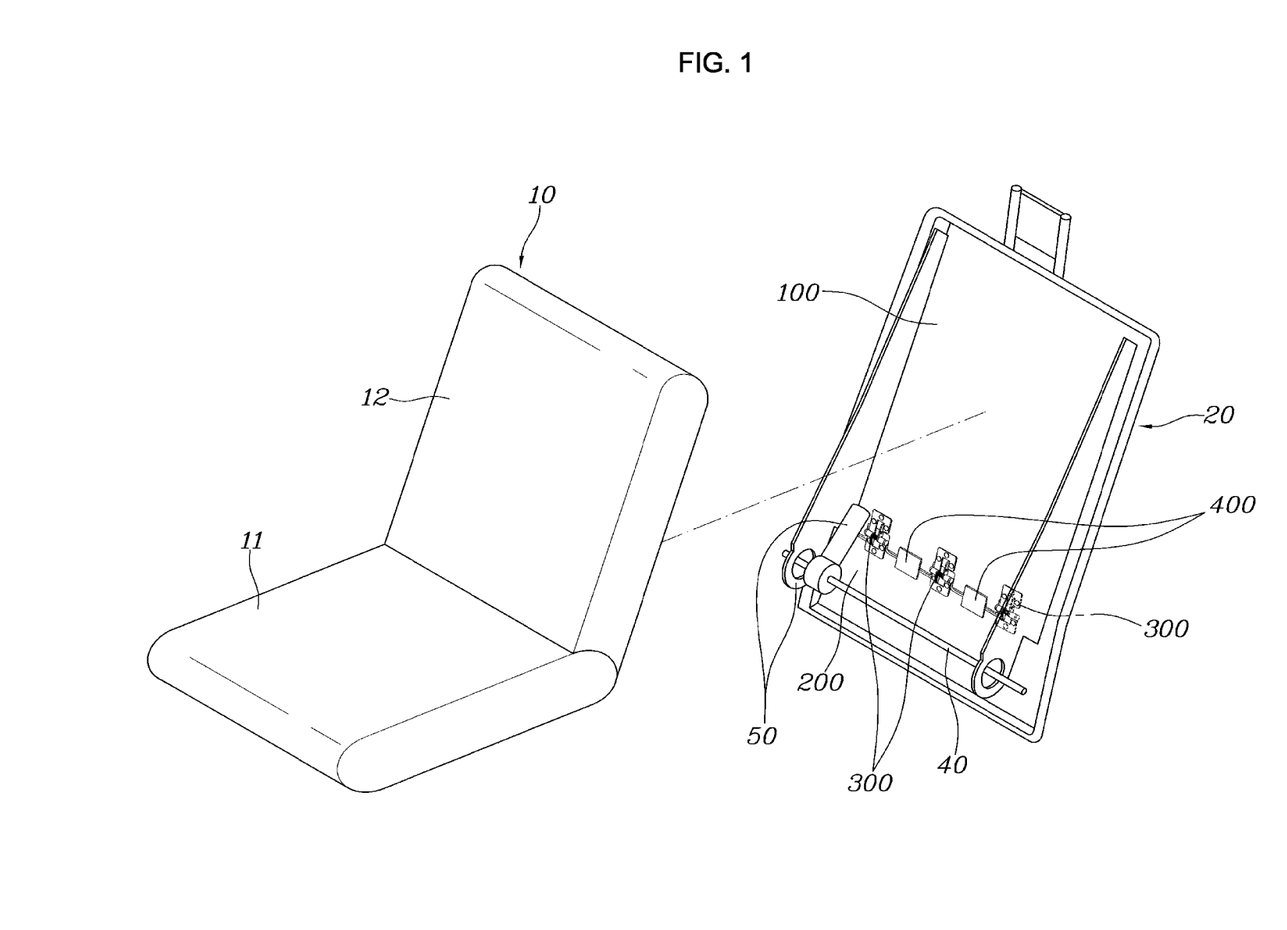
FIG. 1 is an exploded perspective view illustrating a backboard assembly for a vehicular rear seat according to an embodiment of the present disclosure.

The backboard assembly according to the embodiment of the present disclosure is coupled to the seat back 12 of the rear seat 10. The backboard assembly 20 according to the embodiment of the present may include an upper part 100, which is positioned behind the seat back 12 of the rear seat 10 and is coupled thereto, a lower part 200, which is formed separately from the upper part 100 and is positioned under the upper part 100 to shield the gap between the backboard assembly 20 and a luggage board 30, and hinge connectors 300, configured to rotatably connect the upper part 100 to the lower part 200.

The luggage board 30 may be defined as the bottom surface of the luggage compartment. A recliner shaft 40 extends laterally through the lower end of the upper part 100, and the upper part 100 may be rotated together with the seat back 12 about the recliner shaft 40 in an anteroposterior direction with respect to the seat cushion 11. The recliner shaft 40 may be coupled to a recliner 50 including a recliner motor, and the recliner 50 may be fixedly coupled to a seat cushion frame and a seat back frame, and may also be coupled to the upper part 100, constituting the backboard assembly 20, if necessary.

Figure 2:
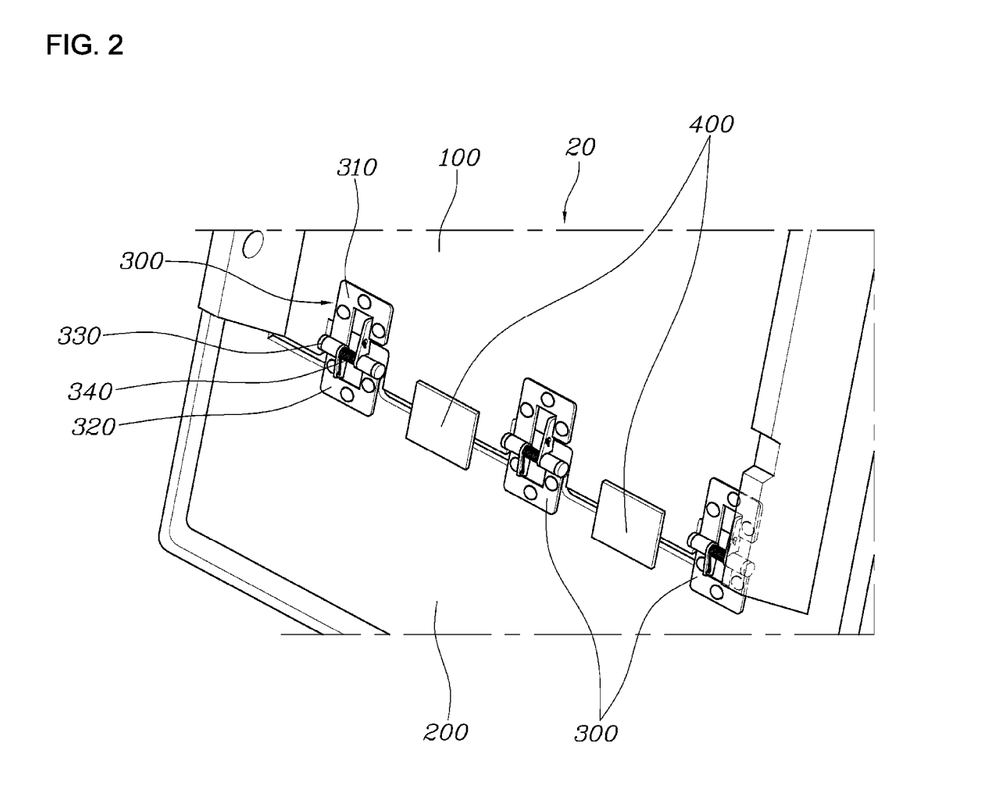
FIG. 2 is an enlarged view of the portion of the backboard assembly shown in FIG. 1 to which a hinge connector is coupled.
Figure 4:
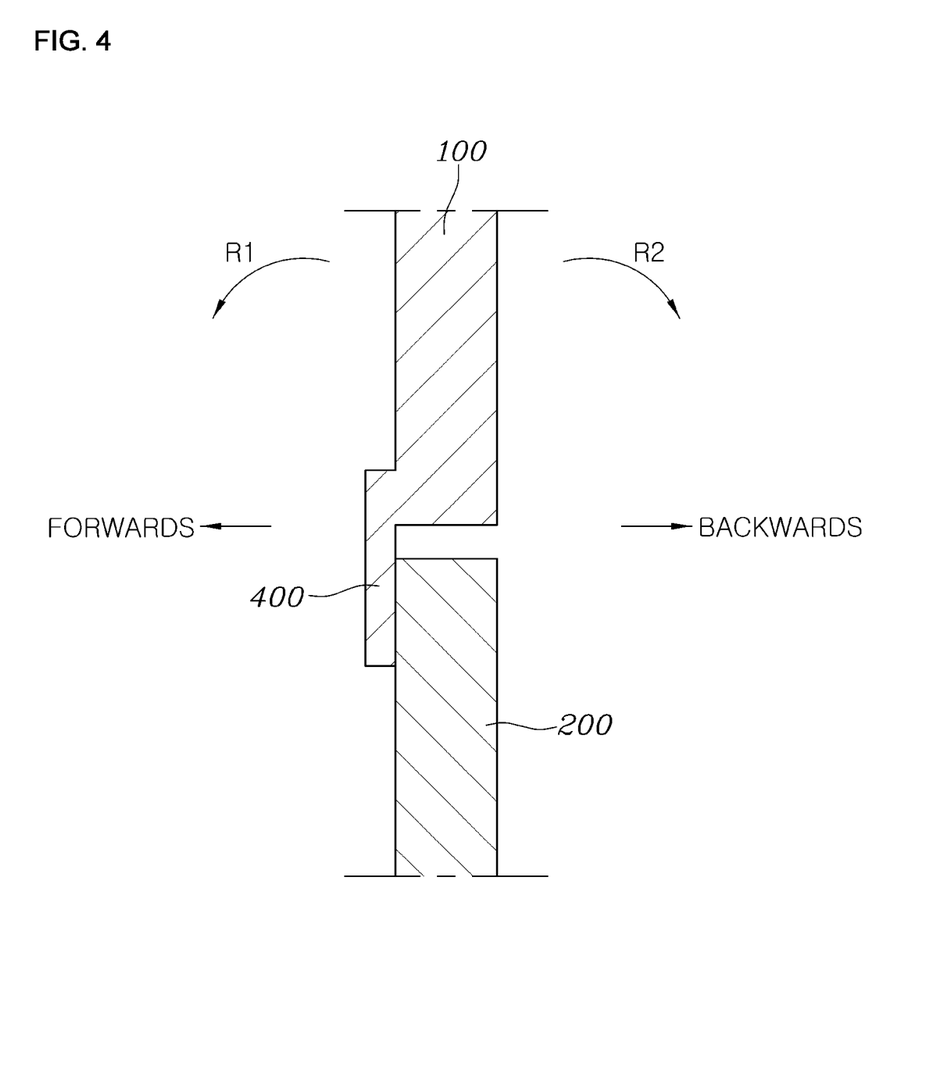
FIG. 4 is a cross-sectional view taken along line I-I in FIG. 2, which illustrates a support according to the embodiment of the present disclosure.

The backboard assembly 20 according to the embodiment of the present disclosure may further include a plurality of supports 400, which are connected at the upper portions thereof to one surface (a front surface) of the lower end of the upper part 100 and which are positioned before the lower part 200 to overlap at the lower portions thereof one surface (a front surface) of the upper end of the lower part 200. The supports 400, each of which is configured to have an approximately rectangular external shape, may be integrally formed with the upper part 100 to be connected to the upper part 100, and may also be connected to the upper part 100 in such a way as to manufacture the supports 400 separately from the upper part 100 and couple the supports 400 to the upper part 100 by additional fastening elements (bolts or the like), if necessary.

When the upper part 100 including the seat back 12 is rotated forwards about the recliner shaft 40 in a normal passenger-sitting mode, in which the seat back 12 is erected (arrow R1 in FIG. 4), the lower portions of the supports 400 come into contact with the upper end of the lower part 200 to thus support the lower part 200, whereby the upper part 100 is rotated forwards together with the lower part 200.

Meanwhile, when the upper part 100 including the seat back 12 is rotated backwards about the recliner shaft 40 in a normal passenger-sitting mode, in which the seat back 12 is erected (arrow R2 in FIG. 4), the lower portions of the supports 400 are rotated and spaced apart from the lower part 200, whereby only the upper part 100 is rotated backwards about the hinge connectors 300.

Figure 3:
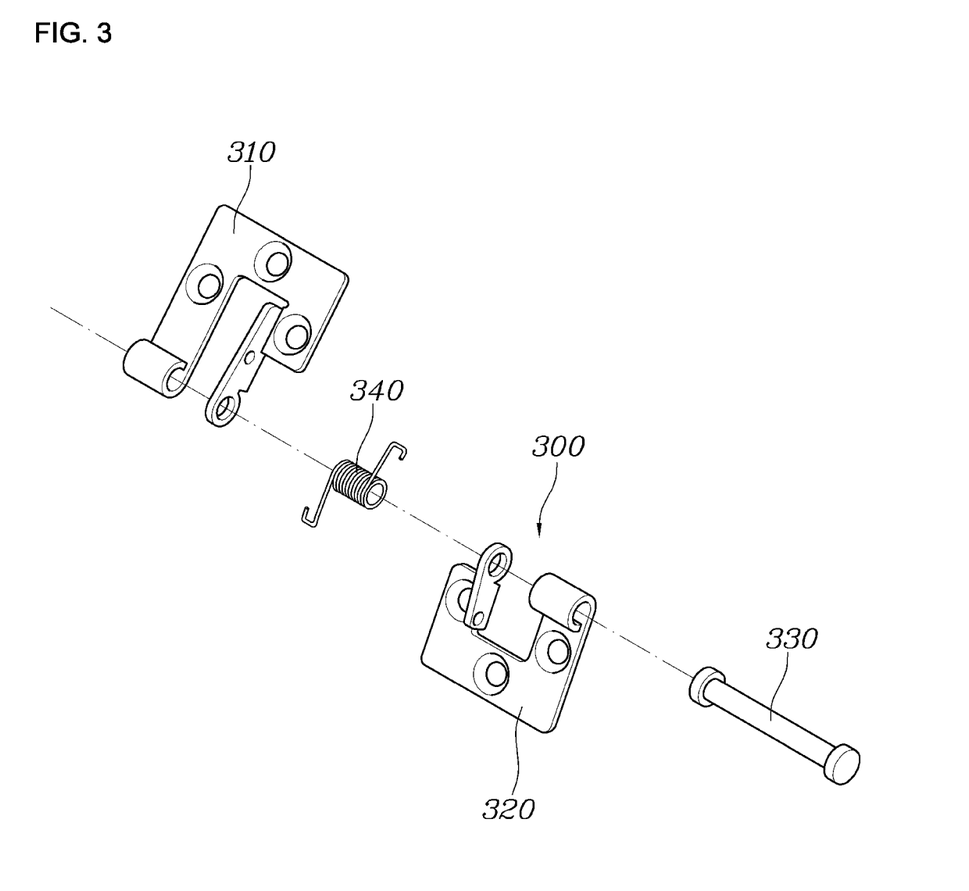
FIG. 3 is an exploded perspective view of the hinge connector according to the embodiment of the present disclosure.

Each of the hinge connectors 300 according to the embodiment of the present disclosure may include an upper hinge bracket 310 fixedly coupled to the lower end of the upper part 100, a lower hinge bracket 320 fixedly coupled to the upper end of the lower part 200, a hinge shaft 330 configured to rotatably connect the upper hinge bracket 310 to the lower hinge bracket 320, and a hinge spring 340, which is wound around the hinge shaft 330 and which is coupled at a first end thereof to the upper hinge bracket 310 and at a second end thereof to the lower hinge bracket 320 to provide elastic force to spread the upper hinge bracket 310 and the lower hinge bracket 320 straight.

The upper part 100 and the lower part 200 of the backboard assembly 20 according to the embodiment of the present disclosure are preferably made of a hard plastic material. Specifically, if the lower part 200 is made of a flexible material as in a conventional skirt part, there are problems in that the shape of the lower part 200 is easily deformed after the lower part is used a certain number of times or more and in that it is impossible to eliminate the gap between the lower part 200 and the luggage board 30 when the seat back 12 is folded forwards in the state in which the shape of the lower part 200 is deformed. Furthermore, when the lower part 200 is made of a flexible material, the shape of which is easily deformed, there are disadvantages in that it is difficult to secure a sense of unity with the luggage compartment when the seat back 12 is folded, thereby deteriorating the appearance, and in that luggage or a hand of a passenger may become jammed in the gap.

To overcome these problems, the backboard assembly 20 according to the embodiment of the present disclosure includes the upper part 100 and the lower part 200 that are made of a hard plastic material. Consequently, the shape of the backboard assembly is not deformed even when the backboard assembly 20 is used a certain number of times or more, and thus it is possible to efficiently eliminate the gap between the backboard assembly 20 and the luggage board 30 when the seat back 12 is folded forwards. In addition, since the space for passengers in the rear seat is completely integrated with the luggage compartment when the seat back 12 is folded, there are advantages of improving the appearance thereof and of eliminating the problem in which luggage or a hand of a passenger is jammed in the gap.

Figure 5:
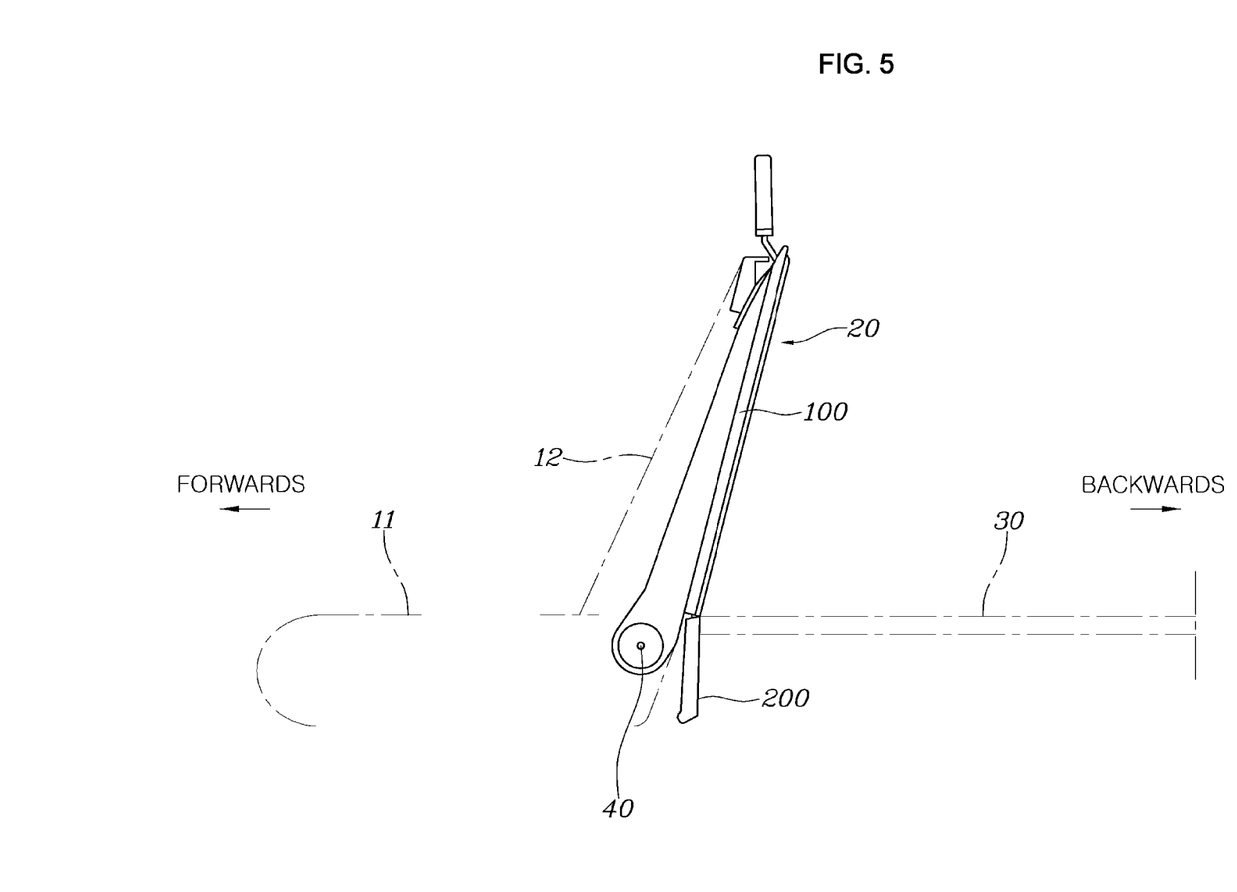
FIGS. 5 to 8 are respective side views illustrating the backboard assembly according to the embodiment of the present disclosure in a normal passenger-sitting mode, a relaxation mode, a flat mode, and a folded mode.

FIG. 5 illustrates the normal passenger-sitting mode in which the seat back 12 is erected. In the normal passenger-sitting mode, the lower part 200 of the backboard assembly 20 is maintained in the state of being erected vertically, and the upper end of the lower part 200 is connected to the front end of the luggage board 30, thereby preventing the formation of a gap between the lower part 200 and the luggage board 30.

Figure 6:
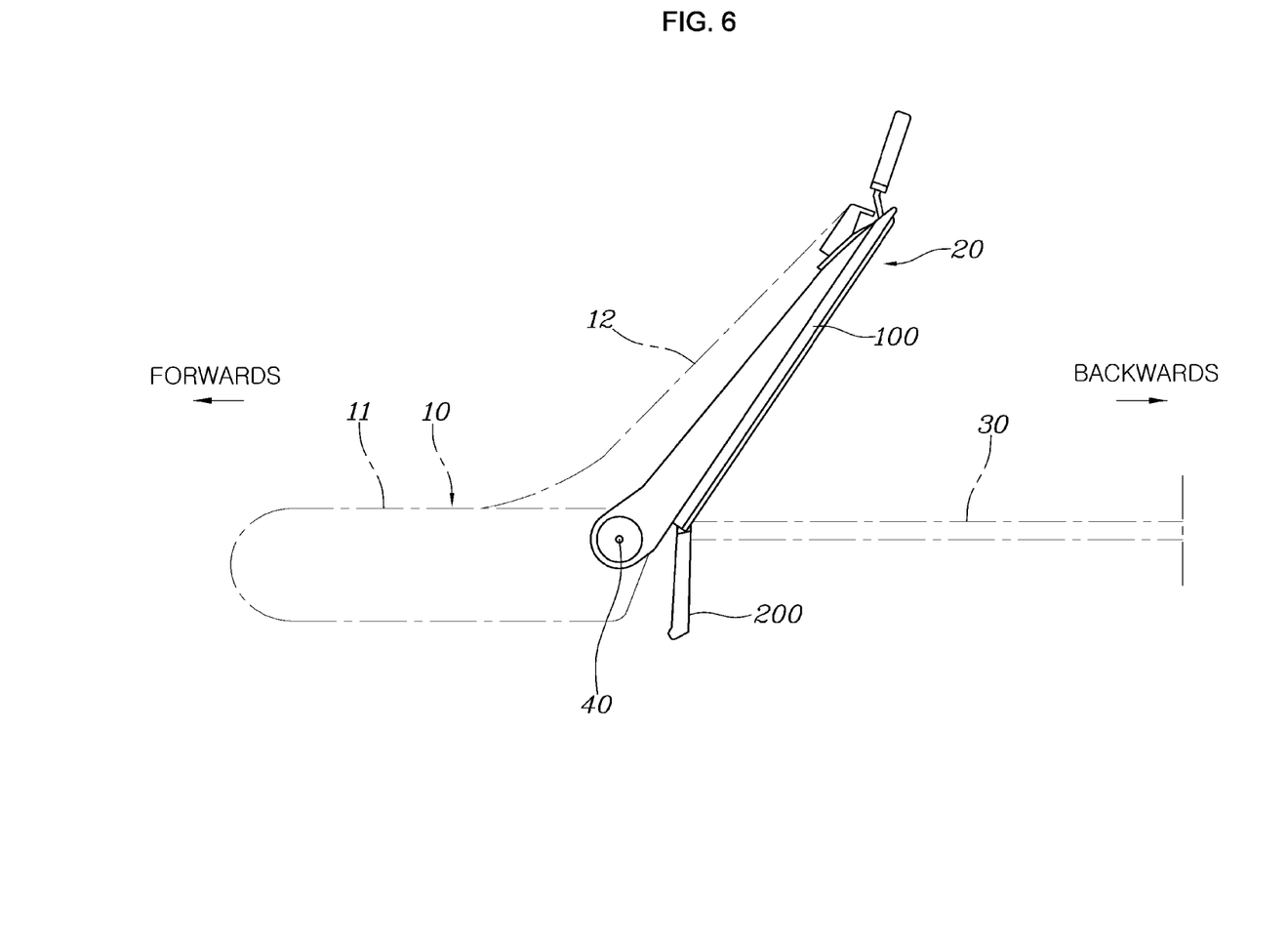

FIG. 6 illustrates a relaxation mode in which the seat back 12 is rotated backwards to a predetermined angle from the position in the normal passenger-sitting mode in which the seat back 12 is erected. In the relaxation mode, the lower part 200 of the backboard assembly 20 is also maintained in the state of being erected vertically, and the upper end of the lower part 200 is also connected to the front end of the luggage board 30, thereby preventing the formation of a gap between the lower part 200 and the luggage board 30.

Figure 7:
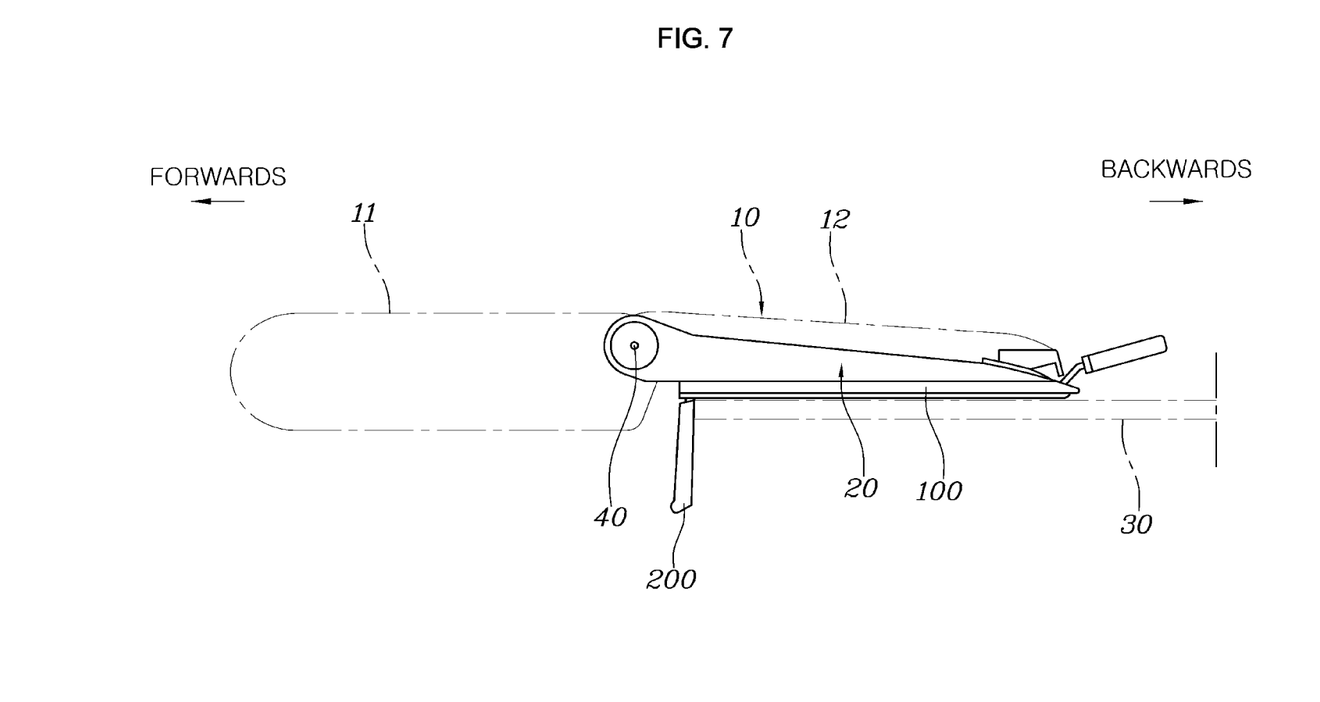

FIG. 7 illustrates a flat mode in which the upper part 100 including the seat back 12 is rotated completely backwards to be aligned with the seat cushion 11. In the flat mode, the lower part 200 of the backboard assembly 20 is also maintained in the state of being erected vertically, and the upper end of the lower part 200 is connected to the front end of the luggage board 30, thereby preventing the formation of a gap between the lower part 200 and the luggage board 30.

According to the embodiment of the present disclosure, since, in the flat mode, the upper end of the lower part 200 is connected to the front end of the luggage board 30 to prevent the formation of a gap therebetween, the internal structure between the seat back 12 and the luggage board 30 is shielded, thereby preventing the internal structure from being exposed to the outside and thus improving the appearance.

Figure 8:
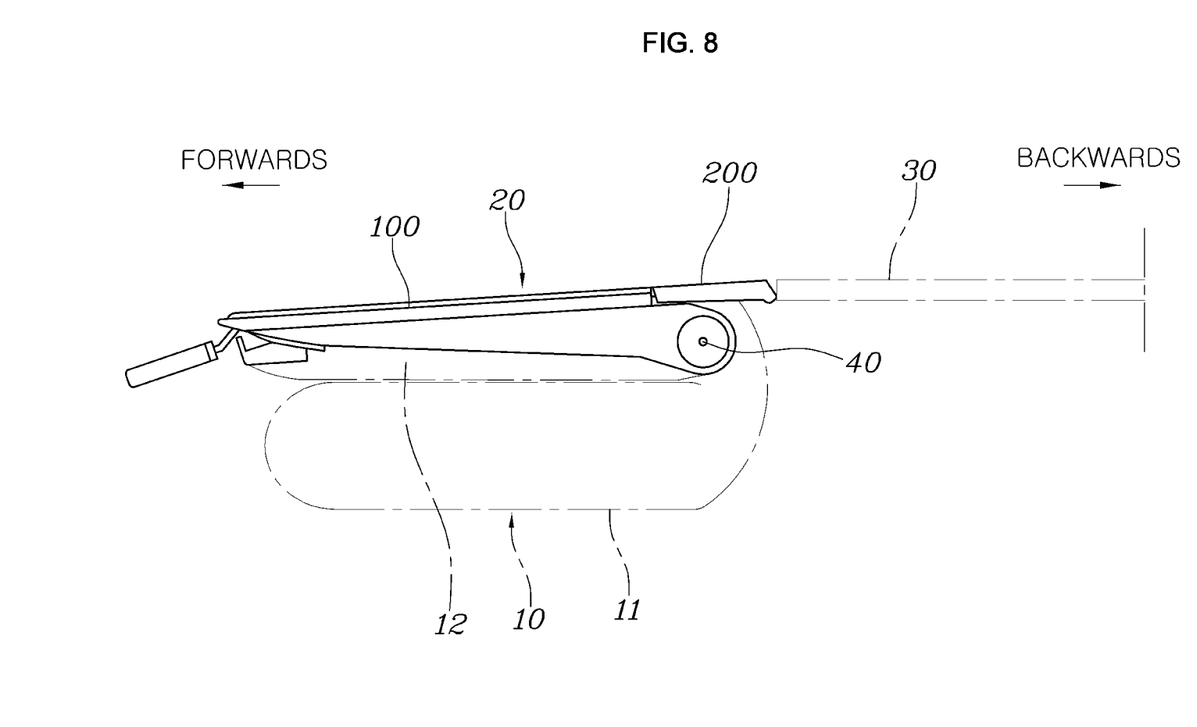

FIG. 8 illustrates a folded mode in which the upper part 100 including the seat back 12 is rotated completely forwards. In the folded mode, since the upper part 100 of the backboard assembly 20, the lower part 200 thereof, and the luggage board 30 are all aligned in a horizontal direction, it is possible to prevent the formation of a gap between the lower part 200 and the luggage board 30.

When the backboard assembly 20 is converted into the folded mode shown in FIG. 8, the space for passengers in the rear seat 10 is completely integrated with the luggage compartment, thereby securing a luggage-loading space. Particularly, since the lower part 200 of the backboard 20 is aligned with the luggage board 30 in a horizontal direction, the passenger space is completely integrated with the luggage compartment, thereby improving the appearance.

As a result, the backboard assembly 20 for a vehicular rear seat according to the embodiment of the present disclosure is capable of efficiently preventing the formation of a gap between the backboard assembly 20 and the luggage board 30, regardless of the operational mode of the rear seat. Particularly, since the space for passengers in the rear seat is efficiently integrated with the luggage compartment when the seat back 12 is folded, it is possible to improve the appearance. Furthermore, it is possible to prevent luggage or a hand of a passenger from becoming jammed therein.

As is apparent from the above description, the present disclosure provides a backboard assembly for a vehicular rear seat, which is composed of upper and lower parts made of a hard plastic material. The backboard assembly is capable of efficiently preventing the formation of a gap between a lower part and a luggage board, regardless of the operational mode of the rear seat and thus of improving the appearance. Furthermore, since the gap formed between the lower part and the luggage board is eliminated, it is possible to prevent luggage or a hand of a passenger from becoming jammed in the gap. Particularly, since the space for passengers in the rear seat is completely integrated with the luggage compartment when the seat back is folded, it is possible to improve the appearance.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A backboard assembly for a vehicular rear seat, comprising:
    an upper part disposed behind a seat back of a rear seat and coupled to the seat back of the rear seat;
    a lower part formed separately from the upper part and disposed under the upper part to shield a gap between the rear seat and a luggage board; and
    a hinge connector configured to rotatably connect the upper part to the lower part,
    wherein the upper part includes at a lower end thereof a recliner shaft that extends through the lower end, and is rotated forwards and backwards with respect to a seat cushion about the recliner shaft together with the seat back.

2. The backboard assembly for a vehicular rear seat according to claim 1, further comprising:
    a plurality of supports connected at upper portions thereof to one surface of the lower end of the upper part and positioned in front of the lower part, wherein lower portions thereof overlap one surface of an upper end of the lower part,
    wherein the upper part including the seat back is rotated forwards about the recliner shaft from a position in a normal passenger-sitting mode in which the seat back is erected, causing lower portions of the supports to come into contact with the upper end of the lower part to support the lower part, and the upper part is rotated forwards together with the lower part.

3. The backboard assembly for a vehicular rear seat according to claim 1, further comprising:
    a plurality of supports connected at upper portions thereof to one surface of the lower end of the upper part and positioned in front of the lower part to overlap at lower portions thereof one surface of an upper end of the lower part,
    wherein the upper part including the seat back is rotated backwards about the recliner shaft from a position in a normal passenger-sitting mode, in which the seat back is erected, causing lower portions of the supports to be rotated away from the lower part, and only the upper part is rotated backwards about the hinge connector.

4. The backboard assembly for a vehicular rear seat according to claim 1, wherein the hinge connector includes:
    an upper hinge bracket fixedly coupled to the lower end of the upper part;
    a lower hinge bracket fixedly coupled to an upper end of the lower part;
    a hinge shaft configured to rotatably connect the upper hinge bracket to the lower hinge bracket; and
    a hinge spring wound around the hinge shaft, wherein the hinge spring is coupled at a first end thereof to the upper hinge bracket and at a second end thereof to the lower hinge bracket to provide elastic force to thus spread the upper hinge bracket and the lower hinge bracket to form a straight arrangement.

5. The backboard assembly for a vehicular rear seat according to claim 1, wherein, in a normal passenger-sitting mode in which the seat back is erected, the lower part is maintained in a state of being erected vertically, and an upper end of the lower part is connected to a front end of the luggage board to prevent the formation of a gap between the lower part and the luggage board.

6. The backboard assembly for a vehicular rear seat according to claim 1, wherein, when the seat back is rotated to a predetermined angle to be converted into a relaxation mode from a normal passenger-sitting mode in which the seat back is erected, the lower part is maintained in a state of being erected vertically, and an upper end of the lower part is connected to a front end of the luggage board to prevent the formation of a gap between the lower part and the luggage board.

7. The backboard assembly for a vehicular rear seat according to claim 1, wherein, when the upper part including the seat back is rotated completely backwards to be converted into a flat mode, in which the upper part including the seat back defines a flat surface together with the seat cushion, the lower part is maintained in a state of being erected vertically, and an upper end of the lower part is connected to a front end of the luggage board to prevent the formation of a gap between the lower part and the luggage board.

8. The backboard assembly for a vehicular rear seat according to claim 7, wherein the upper end of the lower part is connected to the front end of the luggage board to prevent the formation of a gap between the lower part and the luggage board in the flat mode, and an internal structure between the seat back and the luggage board is shielded to prevent exposure of the internal structure to an outside.

9. The backboard assembly for a vehicular rear seat according to claim 1, wherein the upper part including the seat back is rotated completely forwards to be converted into a folded mode, causing the upper part, the lower part, and the luggage board to be aligned in a horizontal direction to prevent the formation of a gap between the lower part and the luggage board.

10. The backboard assembly for a vehicular rear seat according to claim 1, wherein the upper part and the lower part are made of a hard plastic material.

11. A backboard assembly for a vehicular rear seat, comprising:
   an upper part disposed behind a seat back of a rear seat and coupled to the seat back of the rear seat;
   a lower part formed separately from the upper part and disposed under the upper part to shield a gap between the rear seat and a luggage board; and
   a hinge connector configured to rotatably connect the upper part to the lower part,
   wherein, in a normal passenger-sitting mode in which the seat back is erected, the lower part is maintained in a state of being erected vertically, and an upper end of the lower part is connected to a front end of the luggage board to prevent the formation of a gap between the lower part and the luggage board.

12. A backboard assembly for a vehicular rear seat, comprising:
   an upper part disposed behind a seat back of a rear seat and coupled to the seat back of the rear seat;
   a lower part formed separately from the upper part and disposed under the upper part to shield a gap between the rear seat and a luggage board; and
   a hinge connector configured to rotatably connect the upper part to the lower part,
   wherein, when the seat back is rotated to a predetermined angle to be converted into a relaxation mode from a normal passenger-sitting mode in which the seat back is erected, the lower part is maintained in a state of being erected vertically, and an upper end of the lower part is connected to a front end of the luggage board to prevent the formation of a gap between the lower part and the luggage board.

* * * * *